United States Patent
Hegrat et al.

(10) Patent No.: US 10,348,570 B1
(45) Date of Patent: Jul. 9, 2019

(54) DYNAMIC, ENDPOINT CONFIGURATION-BASED DEPLOYMENT OF NETWORK INFRASTRUCTURE

(71) Applicant: Accenture Global Solutions Limited, Dublin (IE)

(72) Inventors: Bradford Henry Hegrat, Montville, OH (US); Vikram Desai, Greenwich, CT (US); Benjamin James Lipczynski, Castleknock (IE); Sadhana Joliet, Southport, CT (US)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 16/117,847

(22) Filed: Aug. 30, 2018

(51) Int. Cl.
| | |
|---|---|
| *H04L 12/24* | (2006.01) |
| *H04L 29/08* | (2006.01) |
| *H04L 29/06* | (2006.01) |
| *G06F 8/60* | (2018.01) |
| *G05B 15/02* | (2006.01) |

(52) U.S. Cl.
CPC ............ *H04L 41/0893* (2013.01); *G06F 8/60* (2013.01); *H04L 41/0803* (2013.01); *H04L 41/12* (2013.01); *H04L 41/145* (2013.01); *H04L 63/0227* (2013.01); *H04L 63/0272* (2013.01); *H04L 63/101* (2013.01); *H04L 67/34* (2013.01); *G05B 15/02* (2013.01); *H04L 67/12* (2013.01)

(58) Field of Classification Search
CPC ......... G05B 15/02; G06F 8/60; G06F 3/0653; H04L 41/0803; H04L 41/08; H04L 41/93; H04L 41/12; H04L 41/145; H04L 41/5054; H04L 63/0227; H04L 63/0272; H04L 63/101; H04L 63/0263; H04L 63/0281; H04L 63/0428; H04L 63/20; H04L 67/12; H04L 67/34; H04L 67/125; H04L 43/026; H04W 12/06
See application file for complete search history.

(56) References Cited

U.S. PATENT DOCUMENTS

| | | | |
|---|---|---|---|
| 9,961,100 B2 | 5/2018 | Marquardt et al. | |
| 2017/0063940 A1* | 3/2017 | Lapidous | H04L 63/0281 |
| 2017/0206034 A1* | 7/2017 | Fetik | G06F 3/0653 |

(Continued)

*Primary Examiner* — Le H Luu
(74) *Attorney, Agent, or Firm* — Harrity & Harrity, LLP

(57) ABSTRACT

An infrastructure deployment platform may receive configuration data relating to a plurality of devices included as components of a system, or a system of systems. The infrastructure deployment platform may process the configuration data, and may determine contextual information concerning the plurality of devices based on processing the configuration data. The contextual information may identify communicative relationships or associations between the plurality of devices. The infrastructure deployment platform may define an organizational structure of a network for the plurality of devices. The organizational structure may constrain communications between the plurality of devices based on the communicative relationships or associations. The infrastructure deployment platform may transmit the contextual information or data regarding the organizational structure to a network infrastructure controller device. The infrastructure deployment platform may perform an action to cause the network to be deployed based on the functional responsibility of the system and/or system of systems.

20 Claims, 8 Drawing Sheets

(56) References Cited

U.S. PATENT DOCUMENTS

| | | | |
|---|---|---|---|
| 2018/0034913 A1* | 2/2018 | Matthieu | H04L 67/125 |
| 2018/0159748 A1* | 6/2018 | Kirner | H04L 41/5054 |
| 2018/0191677 A1* | 7/2018 | Roychoudhury | H04L 43/026 |
| 2018/0191681 A1* | 7/2018 | Mihelich | H04L 63/0263 |
| 2018/0206179 A1* | 7/2018 | Lin | H04W 12/06 |
| 2018/0295036 A1* | 10/2018 | Krishnamurthy | H04L 63/20 |
| 2018/0316692 A1* | 11/2018 | David | H04L 63/0428 |
| 2018/0367541 A1* | 12/2018 | Ponnuswamy | H04L 63/101 |

* cited by examiner

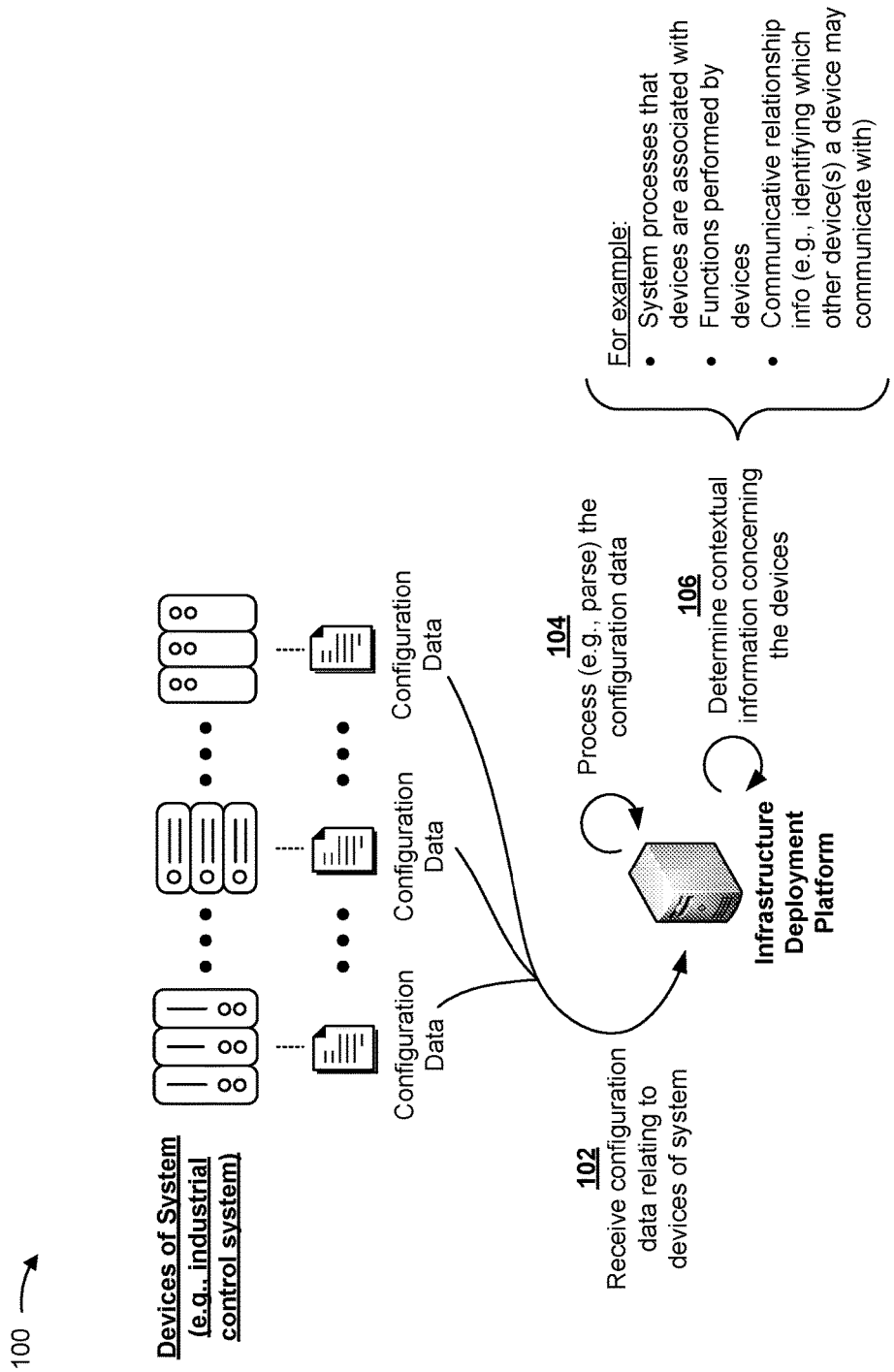

US 10,348,570 B1

DYNAMIC, ENDPOINT CONFIGURATION-BASED DEPLOYMENT OF NETWORK INFRASTRUCTURE

BACKGROUND

Devices, such as Internet-of-Things (IoT) devices, components of industrial control systems, and/or the like, generally communicate with one another over a wired or wireless network.

SUMMARY

According to some possible implementations, a method may include receiving, by an infrastructure deployment platform, configuration data relating to a plurality of devices. The plurality of devices may be included as components of a system. The method may include processing, by the infrastructure deployment platform, the configuration data after receiving the configuration data, and determining, by the infrastructure deployment platform, contextual information concerning the plurality of devices based on processing the configuration data. The contextual information may identify communicative relationships or associations between the plurality of devices. The method may include defining, by the infrastructure deployment platform, an organizational structure of a network for the plurality of devices. The organizational structure may constrain communications between the plurality of devices based on the communicative relationships or associations. The method may include transmitting, by the infrastructure deployment platform, the contextual information or data regarding the organizational structure to a network infrastructure controller device. The method may include performing, by the infrastructure deployment platform, an action to cause the network to be deployed based on the organizational structure.

According to some possible implementations, a device may include one or more memories and one or more processors, communicatively coupled to the one or more memories, configured to receive at least one configuration file relating to a plurality of endpoints of a system. The one or more processors may parse the at least one configuration file after receiving the at least one configuration file. The one or more processors may determine contextual information concerning the plurality of endpoints based on parsing the at least one configuration file. The contextual information may identify functions associated with the plurality of endpoints and/or communicative relationships between the plurality of endpoints. The one or more processors may define a network infrastructure for the plurality of endpoints. The network infrastructure may constrain communications between the plurality of endpoints based on the functions and/or the communicative relationships. The one or more processors may perform an action to cause a network to be implemented based on the network infrastructure.

According to some possible implementations, a non-transitory computer-readable medium may store instructions. The instructions may include one or more instructions that, when executed by one or more processors, cause the one or more processors to receive configuration data relating to a plurality of Internet-of-Things (IoT) devices. The plurality of IoT devices may be communicatively coupled to a network infrastructure controller of a network. The one or more instructions, when executed by the one or more processors, may cause the one or more processors to process the configuration data after receiving the configuration data. The one or more instructions, that cause the one or more processors to process the configuration data, may cause the one or more processors to identify, in the configuration data, network information relating to each IoT device of the plurality of IoT devices, and derive one or more commands based on the network information. The one or more instructions, when executed by the one or more processors, may cause the one or more processors to provide the one or more commands to the network infrastructure controller. The one or more commands may be configured to cause the network infrastructure controller to filter, for each IoT device of the plurality of IoT devices, egress communications originating from the IoT device.

BRIEF DESCRIPTION OF THE DRAWINGS

FIGS. 1A-1C are diagrams of an example implementation described herein.

DETAILED DESCRIPTION

Figure 1B:
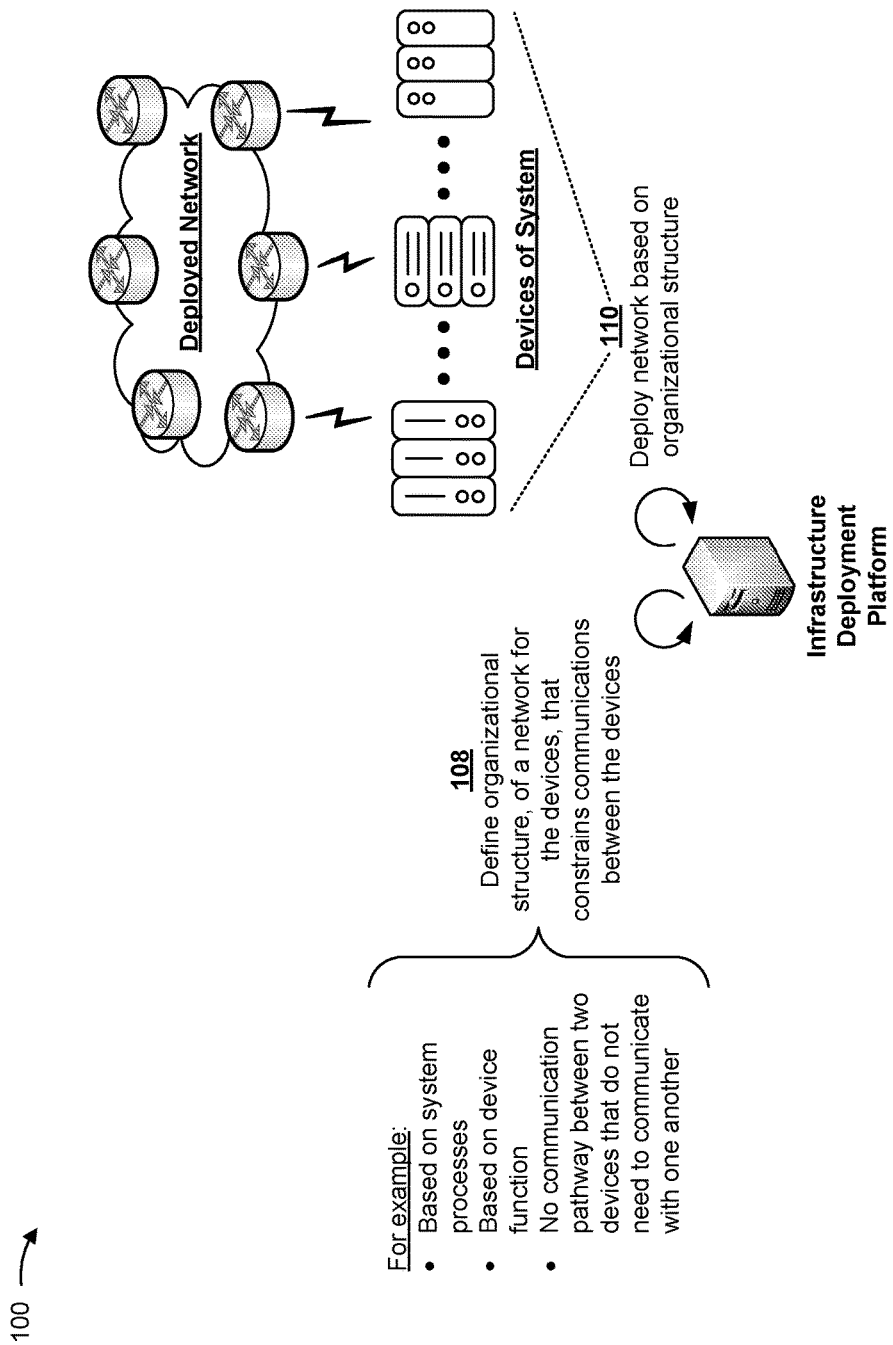

The following detailed description of example implementations refers to the accompanying drawings. The same reference numbers in different drawings may identify the same or similar elements.

Many existing systems, such as industrial control systems, are not designed to enable simple and efficient system management and updates. For example, multiple users may need to be involved if any infrastructure changes need to be made to an industrial control system—e.g., a user (e.g., an operator) requires additional functionality in the operation of a process, requiring that an additional user (e.g., a control systems engineer) translate industrial process requirements to a network infrastructure (e.g., utilizing a command line interface to modify code and/or the like), and provide the requirements to another user (e.g., a network engineer) to implement appropriate adjustments in the network. The fact that many existing systems also incorporate tools and components from a variety of solutions vendors also exacerbates the problem, since additional knowledge and expertise may be needed, making system maintenance and updating a complicated and time-intensive undertaking. As a result of these system management and updating issues, these systems are often not secure because such systems do not evolve network configurations over time (e.g., as devices are added, as threats emerge) due to the difficulty of making such changes.

As such, existing systems are not designed with sufficient security. For example, networks deployed for such systems are generally large "dumping grounds" of ad hoc arrangements that form communication pathways between devices regardless of whether some of those devices even need to communicate with one another. Similarly, networks of IoT devices also have minimal to no security controls or organization controls, which not only makes the devices susceptible to attack and compromise, but also extends risk to the entire interconnected network environment.

Some implementations, described herein, provide an infrastructure deployment platform that is capable of providing dynamic, endpoint configuration-based, deployment of a network infrastructure for a system (e.g., an industrial control system, a system of IoT devices, a dynamic vehicle communications system, and/or the like). In some implementations, the infrastructure deployment platform may employ one or more machine learning algorithms to provide automated system configuration analysis and network design and deployment.

In some implementations, the infrastructure deployment platform may be configured to orchestrate the design, and deployment, of a network infrastructure by processing configuration data relating to devices or endpoints of a system (e.g., data identifying communicative relationships or associations between the devices, control logic relating to the devices, directory structures, and/or the like), determining contextual information concerning the devices (e.g., information that identifies communication pathways between the devices, protocol flows between the devices, processes (e.g., industrial processes), of the system, with which the devices are associated, a type of each device, purposes and/or roles (e.g., functions and/or the like) of the devices, and/or the like), utilizing the contextual information (which may provide insight into the system processes with which the devices are associated, the conditions under which the devices may interact with one another, and an overall layout of the system (e.g., from an industrial perspective)) to define an organizational structure of a network that constrains device-to-device communications (e.g., constrained based on device function, based on process needs, and/or device-to-device communication needs), and deploying the network based on the organizational structure.

In some implementations, the infrastructure deployment platform may leverage an organizational network construct, such as virtual local area networks (VLANs), to define the organizational structure of a network. For example, the infrastructure deployment platform may be configured to dynamically select VLAN IDs and subnets to associate with the devices of a system so as to arrange the devices in logical groups that are aligned with the individual processes of the system and/or based on intended functions of the devices. This may include, but is not limited to, being conducted on a rolling basis. Other examples of types of controls based on which the infrastructure deployment platform may leverage in association with defining the organizational structure of the network include physical segmentation, firewalls, logical segmentation (e.g., in terms Layer 2 or Layer 3 addressing), whitelisting, blacklisting, and/or the like.

In some implementations, the infrastructure deployment platform may overlay security in the deployed network (e.g., by employing security mechanisms, such as those involving the use of a security tag in a Layer 2 Ethernet frame and/or the like) to further secure communications within the network.

In some implementations, the infrastructure deployment platform may be configured to implement communications control for devices of a system. For example, in a system of IoT devices, the infrastructure deployment platform may be configured to process configuration data relating to the devices, determine network information (e.g., communicative relationships or associations between the devices) from the configuration data, and provide the network information (e.g., in an appropriate format) to a network infrastructure controller to manage communications transmitted to the devices and/or originating from the devices, such as by restricting egress communications or traffic to only the appropriate recipient devices, upstream networks, and/or the like.

In this way, the infrastructure deployment platform may leverage the structured nature of a system (such as an industrial control system, and/or the like, which has a finite set of engineered and controlled outcomes) to design and deploy a secure network infrastructure for the devices in the system. Organizing a network infrastructure such that device-to-device communications are constrained based on contextual information, as described herein, solidifies (e.g., hardens) the overall communication architecture of the devices, which provides a more secure network that is less susceptible to attack. This also simplifies the overall network, which enables more efficient deployment of updates and/or upgrades to the system and/or the network. Enabling the design, and deployment, of a network in real-time (or near real-time) while system configurations are being made, as described herein, also allows various portions of the network to be simulated and/or tested earlier in and throughout the development process, which further improves reliability of the final network. Further, filtering egress communications or traffic in a network (e.g., for a system of IoT devices and/or the like), as described herein, restricts malicious actors from compromising the network, which improves overall system security.

Figure 1C:
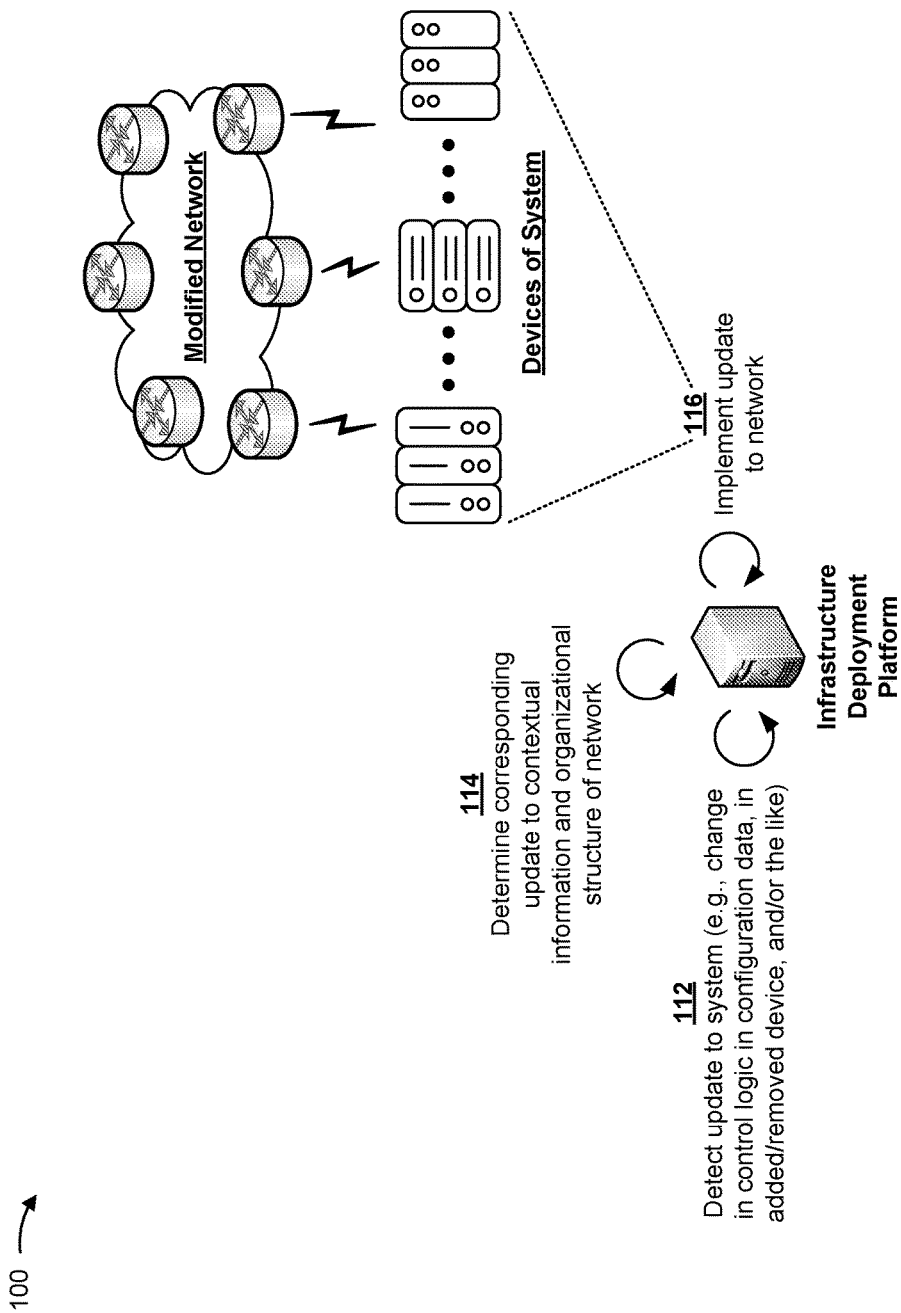

FIGS. 1A-1C are diagrams of an example implementation 100 described herein. Example implementation 100 may include an infrastructure deployment platform and various devices of a system (e.g., an industrial control system and/or the like). For example, the devices may include industrial control system components, such as control devices (e.g., programmable logic controllers (PLCs) and/or the like), input/output (I/O) devices, human machine interface (HMI) devices, computing devices (e.g., workstations), and/or the like, IoT devices, vehicle system components, and/or the like. In some implementations, one of more of these devices may included in a singled device. In some implementations, the infrastructure deployment platform may include one or more applications (e.g., application code and/or algorithms) configured to cause one or more processors of the infrastructure deployment platform to perform various operations, described herein, in an automated manner.

As shown in FIG. 1A, the devices may be associated with configuration data (e.g., configuration files and/or the like). In some implementations, the configuration data may contain device identification information relating to one of more of the devices (e.g., device IDs, device addresses (e.g., Internet Protocol (IP) addresses and/or the like), control logic associated with one or more of the devices (e.g., PLC code and/or the like), information regarding communicative relationships or associations between the devices (e.g., information identifying other devices (e.g., by IP address and/or the like) with which a particular device may communicate), directory structures (e.g., HMI directory structures and/or the like), and/or the like). In some implementations, the configuration file can be firmware based, downloaded, uploaded, manually applied (e.g., as in a PLC configuration, cable modem operations) and/or the like.

As further shown in FIG. 1A, and as shown by reference number 102, the infrastructure deployment platform may receive the configuration data relating to the various devices. As shown by reference number 104, the infrastructure deployment platform may process the configuration data. In some implementations, the configuration data may be in a machine-readable format (e.g., in an Extensible Markup Language (XML) format and/or the like). In such cases, the infrastructure deployment platform may parse the configuration data.

As shown by reference number 106, the infrastructure deployment platform may determine contextual information concerning the devices based on the configuration data. For example, contextual information may include information regarding communication pathways between the devices, information regarding protocol flows between the devices, information regarding the individual processes (e.g., industrial processes), of the system, with which the devices are associated, information regarding a type of each of the devices, information regarding the purposes and/or roles (e.g., functions and/or the like) of the devices, information captured from human interactions (e.g., HMI files), and/or the like. Such contextual information may enable the infrastructure deployment platform to gain insight into the system processes with which the devices are associated, the conditions under which the devices may interact with one another, and an overall layout of the system (e.g., from an industrial perspective), some or all of which the infrastructure deployment platform may leverage to structure, and deploy, an appropriate network for the devices. Such contextual information may enable the infrastructure deployment platform to forecast and/or determine the risk of a fault and/or removal of an element and/or criticality of a node of the industrial process and/or system and/or enhance maintenance planning and/or incident response. In some cases, this may be conducted in real-time or near real-time.

In some implementations, the infrastructure deployment platform may, based on processing first configuration data relating to a first device, identify a second device with which the first device may communicate, obtain second configuration data relating to the second device, similarly process the second configuration data to identify any other devices with which the second device may communicate, and so on. In such cases, the infrastructure deployment platform may iteratively aggregate data, regarding all the various device-to-device connections and/or relationships in the system, for use with determining contextual information.

As shown in FIG. 1B, and as shown by reference number 108, the infrastructure deployment platform may define an organizational structure of a network, for the devices, that constrains communications between the devices. As shown by reference number 110, the infrastructure deployment platform may deploy the network based on the organizational structure (e.g., by transmitting the contextual information or data regarding the organizational structure to a network infrastructure controller device, by configuring various network devices (e.g., switches, routers, firewalls, and/or the like) as needed, and/or the like). For example, the infrastructure deployment platform may define the organizational structure based on the contextual information (e.g., based on the processes with which the devices may be associated, the functions of the devices, an actual need for one or more of the devices to communicate with one or more of the other devices (e.g., as specified in the configuration data), and/or the like), such that the network includes only the needed communication pathways or links. That is, for example, the network infrastructure may not include a communication pathway between two devices that, based on the contextual information, do not need to communicate with one another. In some implementations, the infrastructure deployment platform may logically arrange the devices in groups based on the intended, individual, and/or collective functions of the devices.

Organizing the network infrastructure such that device-to-device communications are constrained, based on the contextual information, solidifies (e.g., hardens) the overall communication architecture of the devices, which provides a more secure network that is less susceptible to attack and/or that minimizes an impact of a breach (e.g., by preventing attackers from moving laterally). This also simplifies the overall operation of the network, which enables more efficient deployment of updates and/or upgrades to the system and/or the network.

In some implementations, the infrastructure deployment platform may define the organizational structure of a network using any suitable network organizational construct. For example, in some implementations, the infrastructure deployment platform may leverage virtual local area networks (VLANs) to define the organizational structure. For example, the infrastructure deployment platform may leverage the logical subnetwork nature of a VLAN to group devices together in such a manner that the groups align with individual processes of the system or system of systems. In some implementations, the infrastructure deployment platform may utilize a VLAN schema to configure VLANs for the devices. For example, the VLAN schema may be pre-defined (e.g., based on user input (e.g., input by a control systems engineer, a network engineer, a process expert, and/or the like)). In some implementations, the infrastructure deployment platform may group devices together by associating particular subnets of devices with particular VLAN IDs based on the VLAN schema.

In this way, the infrastructure deployment platform may dynamically configure the devices into VLANs based on the functionality of the devices and/or the needed communication pathways or links between the devices.

In some implementations, the infrastructure deployment platform may utilize one or more machine learning algorithms to automate the design of an organizational structure of a network. For example, in some implementations the infrastructure deployment platform may use one or more machine learning algorithms configured to learn how to properly associate devices with VLAN IDs. In some implementations, the infrastructure deployment platform may provide information regarding associations of devices with VLAN IDs as input to one or more machine learning algorithms, which may perform machine learning to automate future determinations or predictions of associations of devices with VLAN IDs. For example, the infrastructure deployment platform may train a machine learning algorithm based on known inputs (e.g., one or more VLAN schemas, information regarding device functionality, information regarding device-to-device communications, information regarding system processes associated with devices, and/or the like) and known outputs (e.g., actual associations of devices with VLAN IDs and/or the like). In some implementations, the infrastructure deployment platform may refine a machine learning algorithm based on feedback received from a user of the infrastructure deployment platform and/or from one or more other devices (e.g., management device(s)) and/or other information feeds, such as threat intelligence feeds and/or the like. For example, the user of the infrastructure deployment platform and/or one or more management devices may provide information indicating whether predictions of associations of devices with VLAN IDs, made by the machine learning algorithm, are accurate and/or helpful. When the information indicates that a particular prediction is accurate and/or helpful, the infrastructure deployment platform may configure the machine learning algorithm to make predictions of associations of devices with VLAN IDs based on the particular prediction (e.g., to predict associations of devices with VLAN IDs in a manner similar to that in which the particular prediction was made). When the information indicates that a particular prediction is not accurate or helpful, the infrastructure deployment platform may configure the machine learning algorithm to avoid associating devices with VLAN IDs in a manner in which the particular prediction was made. In this way, the infrastructure deployment platform can predict associations of devices with VLAN IDs based on a machine learning algorithm, which improves the accuracy of the predictions, and conserves processor resources and/or storage resources that may otherwise be used to generate and store rules for predicting associations of devices with VLAN IDs.

In some implementations, the infrastructure deployment platform may be configured to leverage traffic control mechanisms as part of defining the organizational structure of a network and/or deploying the network. For example, VLANs enable deployment of an access control list (ACL) for traffic flow management. In some implementations, the infrastructure deployment platform may deploy such an ACL as a security capability in the network. Additionally, or alternatively, the infrastructure deployment platform may utilize a security mechanism (e.g., media access control security (MACsec) encryption, an authentication store, and/or the like, involving the use of security tags in Layer 2 Ethernet frames for dynamic application control) to further secure communications within the network (e.g., Layer 2 traffic as well as traffic transmitted using higher layer protocols (e.g., IP traffic)).

In this way, the infrastructure deployment platform may leverage an organizational construct, such as that provided by VLANs, to design a network environment that is clean and simple (e.g., from a traffic standpoint and correlating to the physical process, device function, and/or the like), may overlay security in the resulting network infrastructure to control authentication and access between the devices, and/or may include the ability to be fully dynamic such that faults can be dynamically overcome to maintain an industrial process.

As shown in FIG. 1C, and as shown by reference number 112, the infrastructure deployment platform may detect (e.g., in real-time (or near real-time)) an update to the system. For example, in some cases, a user (e.g., a control systems engineer and/or the like) may modify instruction code (e.g., relating to control logic in the configuration data)—e.g., a user may check instruction code out of a repository of the system, edit the instruction code, and check the edited instruction code back into the repository. As another example, a user (e.g., a control systems engineer and/or the like) may modify the system hardware by adding one or more devices to the system and/or removing one or more devices from the system, and changing the relevant configuration data.

As shown by reference number 114, the infrastructure deployment platform may determine corresponding update(s) to the contextual information and the organizational structure of the network. For example, the infrastructure deployment platform may, based on changes in the configuration data, determine any changes to the contextual information (e.g., device-and-process associations, communicative relationships or associations between the devices, device functions, and/or the like) and update the organizational structure accordingly (e.g., using machine learning, as described above). As shown by reference number 116, the infrastructure deployment platform may implement the update such that the network reflects the updated organizational structure. In some implementations, and in a case where the infrastructure deployment platform employs machine learning algorithm(s) (e.g., as described above), the machine learning algorithm(s) may be configured to determine the appropriate network-level design changes and implement the changes in the network infrastructure.

In this way, the infrastructure deployment platform may automate, and orchestrate, interactions between a user (e.g., a control systems engineer) and the system by seamlessly updating (e.g., in real-time or near real-time) the network infrastructure to reflect any changes that are made to the system.

Further, existing system development processes generally incorporate generic network constructs (e.g., generic layouts, subnets, IP addresses, and/or the like) and neglect testing of various aspects of the networks (e.g., the I/O devices and/or the like) during development. The infrastructure deployment platform, described herein, may be utilized to design, and deploy, a network in real-time (or near real-time), while system configurations are being made (e.g., while the above-described configuration data is being generated and/or created, while control logic is being coded, and/or the like). This allows various portions of a network to be tested throughout the development process, which enables the creation of an overall hardened, function-based, and reliable network for the system.

In some implementations, the infrastructure deployment platform may be configured to provide additional security control functions. For example, in some implementations, the infrastructure deployment platform may perform security monitoring of a system and/or a corresponding network to identify any devices in the system that may be under attack, and determine, based on the above-described contextual information (e.g., which may be indicative of which devices have higher priority over other devices, which devices are critical to the system, and/or the like), one or more actions that may need to be taken (e.g., such as deactivating some of the devices in the system or deactivating all of the devices in the system, depending on which device(s) are under attack) within context to allow the industrial function to continue safely. This provides a more strategic approach to cyber defense that reduces or eliminates a need for additional security functions to be deployed in a network, thereby conserving computing resources and memory resources. This also reduces or eliminates the possibility that an attack may render the entire system and/or network inoperable, which conserves costs that may otherwise need to be expended for crisis management, repairs, and/or the like.

Additionally, or alternatively, the infrastructure deployment platform may be configured to provide the contextual information to another security system to enable the security system to identify attacks and implement remedies as appropriate.

The dynamic, endpoint configuration-based, infrastructure deployment technique, described herein, may be leveraged for a variety of applications. For example, the infrastructure deployment platform may be configured to design, and deploy, networks for systems, such as industrial control systems, systems of industrial IoT devices, systems of smart city IoT devices, systems of consumer IoT devices (e.g., with supporting hardware routers and/or access points), dynamic vehicle communications (e.g., Vehicle-to-everything (V2X), Vehicle-to-Vehicle (V2V), Vehicle-to-Infrastructure (V2I), and/or the like), and/or other non-standard, purpose-built computing environments.

In some implementations, the infrastructure deployment platform may be capable of filtering egress communications of devices such that a given device may communicate with only those device(s) needed as part of carrying out function(s) of the device. In this way, egress communications can be authorized as valid communications (e.g., based on the known functionality of the given device, derived from the configuration data). This restricts external sources (e.g., malicious actors), that manage to access the device, from being able to utilize the device to attack other devices of the system, and/or extraction of data, which improves the overall security of the system.

For example, in an IoT device environment (e.g., such as household IoT devices, industrial IoT devices, smart city IoT devices, and/or the like), the infrastructure deployment platform may be configured to filter an IoT device's egress communications. In some implementations, the infrastructure deployment platform may be configured to obtain (e.g., from a server device configured to manage the IoT devices and/or the like) configuration data relating an IoT device, and process (e.g., parse) the configuration data to identify network information, such as information identifying communicative relationships or associations with intended, or target, recipient(s). For example, the network information may identify, for a given IoT device, device IDs, addresses (e.g., IP addresses), domain names, and/or the like associated with IoT server device(s) with which the IoT device needs to communicate as part of the IoT device's normal functions. In some implementations, the infrastructure deployment platform may be configured to process the network information (e.g., by formatting the network information in a predefined manner so as to implement traffic filtering), and provide (e.g., upload and/or the like) the processed network information to a network infrastructure controller to enable the network infrastructure controller to filter the communications originating from the IoT device—e.g., such that only those communications, directed to an intended recipient associated with the IoT device, are permitted to traverse through the network. In some implementations, the infrastructure deployment platform may be configured to provide updated network information to the network infrastructure controller based on changes to the configuration data (e.g., changes to communicative relationships or associations and/or the like) in real-time (or near real-time).

In this way, the infrastructure deployment platform may filter egress communications by restricting such communications to only the appropriate recipient devices, upstream networks, and/or the like. This may prevent an IoT device from being hijacked and used, for example, as an attack vehicle. Further, this provides a cyber security system in an IoT device environment that is otherwise susceptible to attack, and enables dynamic control of communications of IoT devices as the network infrastructure changes and/or new threats emerge.

As indicated above, FIGS. 1A-1C are provided merely as examples. Other examples are possible and may differ from what was described with regard to FIGS. 1A-1C.

Figure 2:
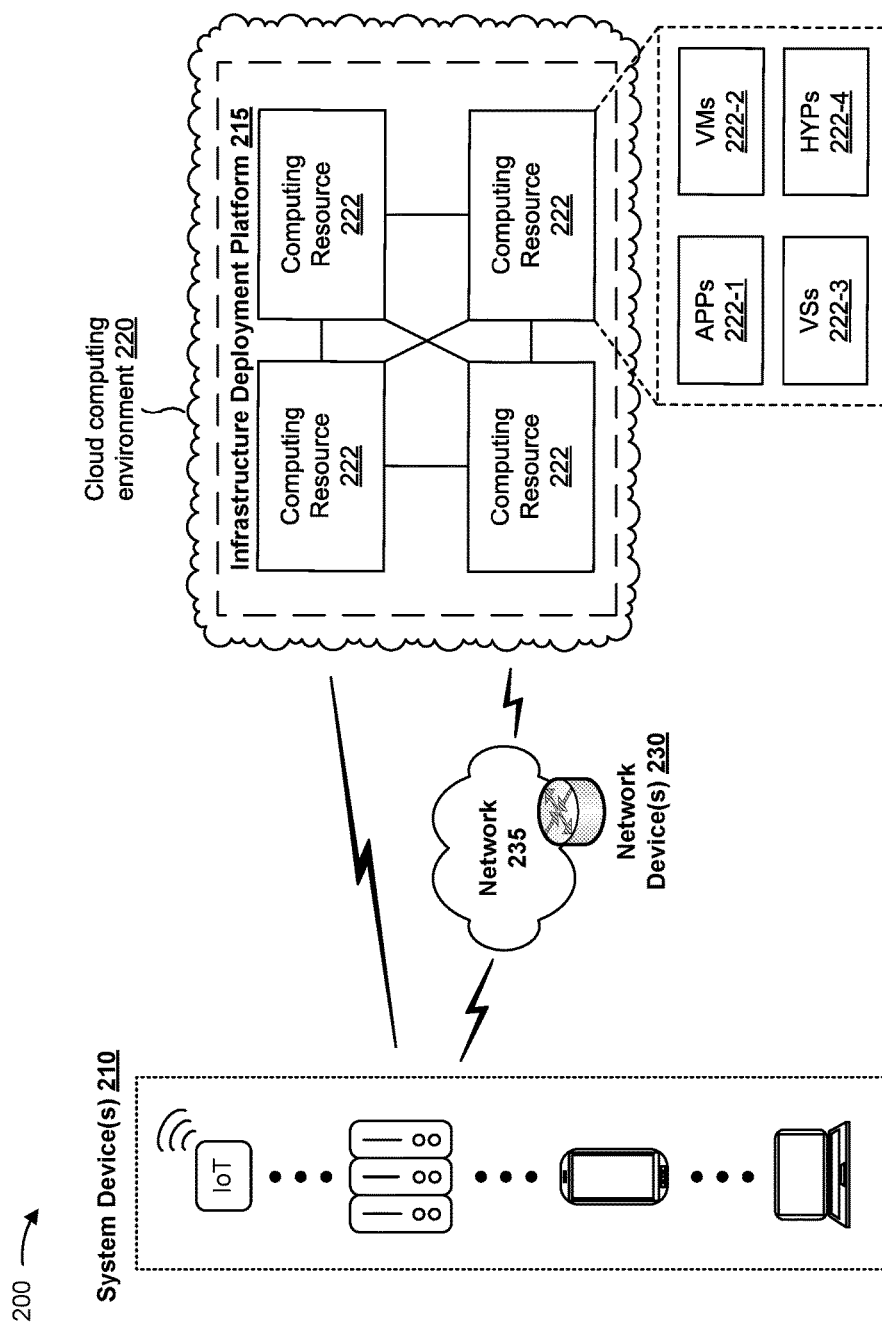
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include system device(s) 210, an infrastructure deployment platform 215, network device(s) 230, and a network 235. Devices of environment 200 may interconnect via wired connections, wireless connections, or a combination of wired and wireless connections.

System device(s) 210 include one or more devices capable of receiving, generating, storing, processing, and/or providing data associated with a system (e.g., an industrial control system (ICS), a distributed control system (DCS), a building automation system (BAS), a building management system (BMS), an industrial Internet-of-Things (IIoT) system, an Internet-of-Things (IoT) system, system including one or more medical devices, a system including one or more vehicles, and/or the like.

a system of IoT devices, a dynamic vehicle communications system, and/or the like). For example, system device(s) 210 may include one or more industrial control devices (e.g., one or more control devices, I/O devices, HMI devices, computing devices, and/or the like), one or more IoT devices (e.g., one or more computers, laptops, tablets, smartphones, smart watches, smart sensors, smart accessories, smart televisions, smart security systems, smart home systems, networked devices (e.g., appliances, peripherals, lighting systems, vehicle accessories, and/or the like), communication devices, server devices for communicating with IoT devices), and/or the like. In some implementations, system device(s) 210 may be associated with configuration data, which an infrastructure deployment platform (e.g., infrastructure deployment platform 215) may process and utilize to structure, and deploy, a network for system device(s) 210, as described elsewhere herein.

Infrastructure deployment platform 215 includes one or more devices capable of receiving, generating, storing, processing, and/or providing data associated with system device(s) 210 and/or network device(s) 230. In some implementations, infrastructure deployment platform 215 may utilize configuration data, relating to devices (e.g., system device(s) 210), to structure, and deploy (e.g., using network device(s) 230), a network (e.g., network 235) for the devices, as described elsewhere herein. In some implementations, infrastructure deployment platform 215 may employ one or more machine learning algorithms to structure, and deploy, the network, as described elsewhere herein.

Infrastructure deployment platform 215 may include a server device or a group of server devices. In some implementations, as shown, infrastructure deployment platform 215 can be hosted in a cloud computing environment 220. Notably, while implementations described herein describe infrastructure deployment platform 215 as being hosted in cloud computing environment 220, in some implementations, infrastructure deployment platform 215 is not cloud-based or can be partially cloud-based.

Cloud computing environment 220 includes an environment that delivers computing as a service, whereby shared resources, services, etc. can be provided to system device(s) 210, network device(s) 230, and/or one or more other infrastructure deployment platforms 215. Cloud computing environment 220 can provide computation, software, data access, storage, and/or other services that do not require end-user knowledge of a physical location and configuration of a system and/or a device that delivers the services. As shown, cloud computing environment 220 can include a set of computing resources 222.

Computing resource 222 includes one or more personal computers, workstation computers, server devices, or another type of computation and/or communication device. In some implementations, computing resource 222 can host infrastructure deployment platform 215. In some implementations, cloud resources can include compute instances executing in computing resource 222, storage devices provided in computing resource 222, data transfer devices provided by computing resource 222, etc. In some implementations, computing resource 222 can communicate with other computing resources 222 via wired connections, wireless connections, or a combination of wired and wireless connections.

As further shown in FIG. 2, computing resource 222 can include a group of cloud resources, such as one or more applications ("APPs") 222-1, one or more virtual machines ("VMs") 222-2, virtualized storage ("VSs") 222-3, one or more hypervisors ("HYPs") 222-4, and/or the like.

Application 222-1 includes one or more software applications that can be provided to or accessed by system device(s) 210 and/or network device(s) 230. Application 222-1 can eliminate a need to install and execute the software applications on system device(s) 210 and/or network device(s) 230. For example, application 222-1 can include software associated with infrastructure deployment platform 215 and/or any other software capable of being provided via cloud computing environment 220. In some implementations, one application 222 1 can send/receive information to/from one or more other applications 222-1, via virtual machine 222-2.

Virtual machine 222-2 includes a software implementation of a machine (e.g., a computer) that executes programs like a physical machine. Virtual machine 222-2 can be either a system virtual machine or a process virtual machine, depending upon use and degree of correspondence to any real machine by virtual machine 222-2. A system virtual machine can provide a complete system platform that supports execution of a complete operating system (OS). A process virtual machine can execute a single program, and can support a single process. In some implementations, virtual machine 222-2 can execute on behalf of a user (e.g., a system device 210 and/or a network device 230) and/or on behalf of one or more other infrastructure deployment platforms 215, and can manage infrastructure of cloud computing environment 220, such as data management, synchronization, or long-duration data transfers.

Virtualized storage 222-3 includes one or more storage systems and/or one or more devices that use virtualization techniques within the storage systems or devices of computing resource 222. In some implementations, within the context of a storage system, types of virtualizations can include block virtualization and file virtualization. Block virtualization can refer to abstraction (or separation) of logical storage from physical storage so that the storage system can be accessed without regard to physical storage or heterogeneous structure. The separation can permit administrators of the storage system flexibility in how the administrators manage storage for end users. File virtualization can eliminate dependencies between data accessed at a file level and a location where files are physically stored. This can enable optimization of storage use, server consolidation, and/or performance of non-disruptive file migrations.

Hypervisor 222-4 provides hardware virtualization techniques that allow multiple operating systems (e.g., "guest operating systems") to execute concurrently on a host computer, such as computing resource 222. Hypervisor 222-4 can present a virtual operating platform to the guest operating systems, and can manage the execution of the guest operating systems. Multiple instances of a variety of operating systems can share virtualized hardware resources.

Network device(s) 230 include one or more devices capable of receiving, storing, generating, processing, and/or transferring traffic (e.g., packets) associated with system device(s) 210, and/or capable of monitoring traffic for system device(s) 210 and/or network 235. For example, network device 230 may include a router, a gateway, a switch, a hub, a bridge, a reverse proxy, a server (e.g., a proxy server, a web server, a host server, a storage server, a server in a data center or cloud computing environment, etc.), a firewall, a security device, an intrusion detection device, a load balancer, or a similar type of device. Network device 230 may be used in connection with a single system device 210 or a group of system devices 210 (e.g., system devices 210 associated with a private network, a data center, etc.). In some implementations, communications may be routed through network device 230 to reach the group of system devices 210. Additionally, or alternatively, communications may be routed to network device 230 when the communications are directed toward one or more system devices 210. In some implementations, network device 230 may be a physical device implemented within a housing, such as a chassis. In some implementations, network device 230 may be a virtual device implemented by one or more computer devices of a cloud computing environment or a data center.

Network 235 includes a network associated with system device(s) 210 and network device(s) 230. For example, network 235 may include a VLAN, a subnet, a wireless network, a wired network, a particular network segment (e.g., a group of networked devices connected to one or more network gateways), an Ethernet segment, a plurality of network segments, a plurality of Ethernet segments, and/or the like. In some implementations, network 235 may be structurally organized, and deployed, by an infrastructure deployment platform (e.g., infrastructure deployment platform 215), as described elsewhere herein.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
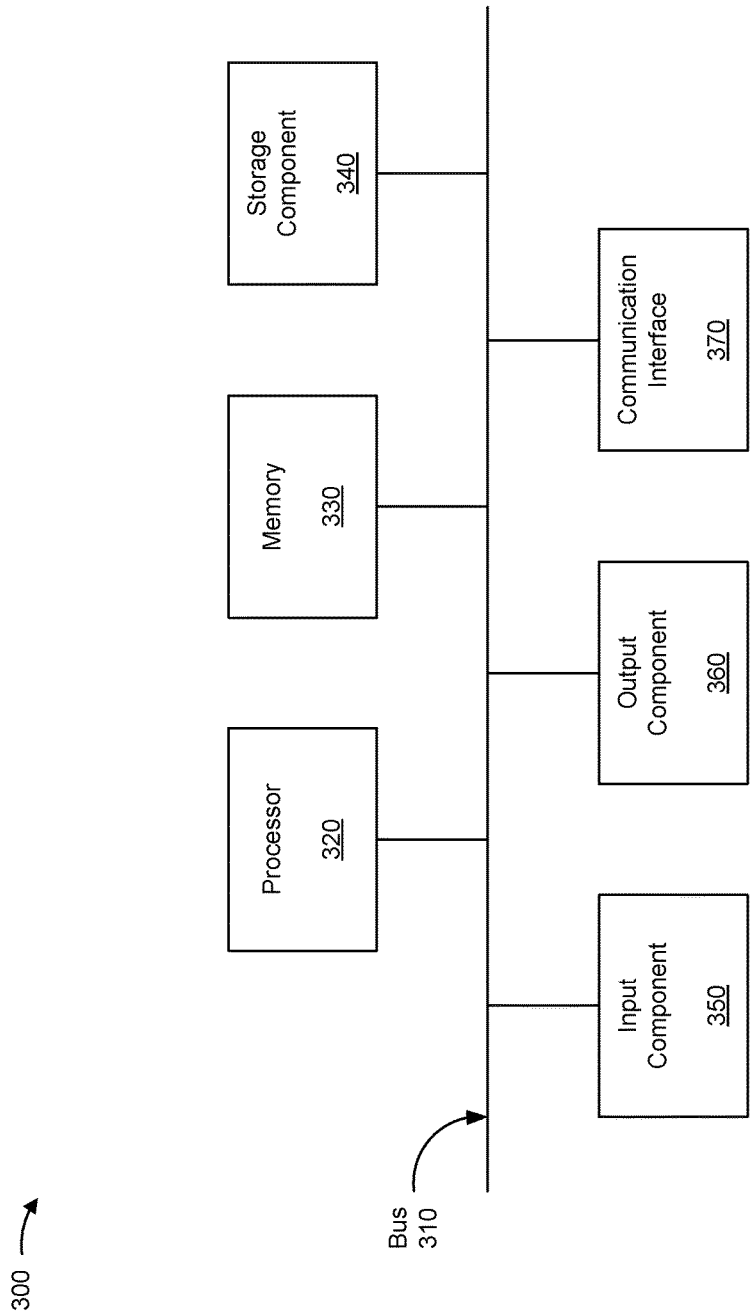
FIG. 3 is a diagram of example components of one or more devices of FIG. 2.

FIG. 3 is a diagram of example components of a device 300. Device 300 may correspond to system device(s) 210, infrastructure deployment platform 215, and/or network device(s) 230. In some implementations, system device(s) 210, infrastructure deployment platform 215, and/or network device(s) 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, an actuator, and/or image sensor(s) (e.g., camera(s))). Output component 360 includes a component that provides output information from device 300 (e.g., a display, a speaker, and/or one or more LEDs).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a wireless local area network interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
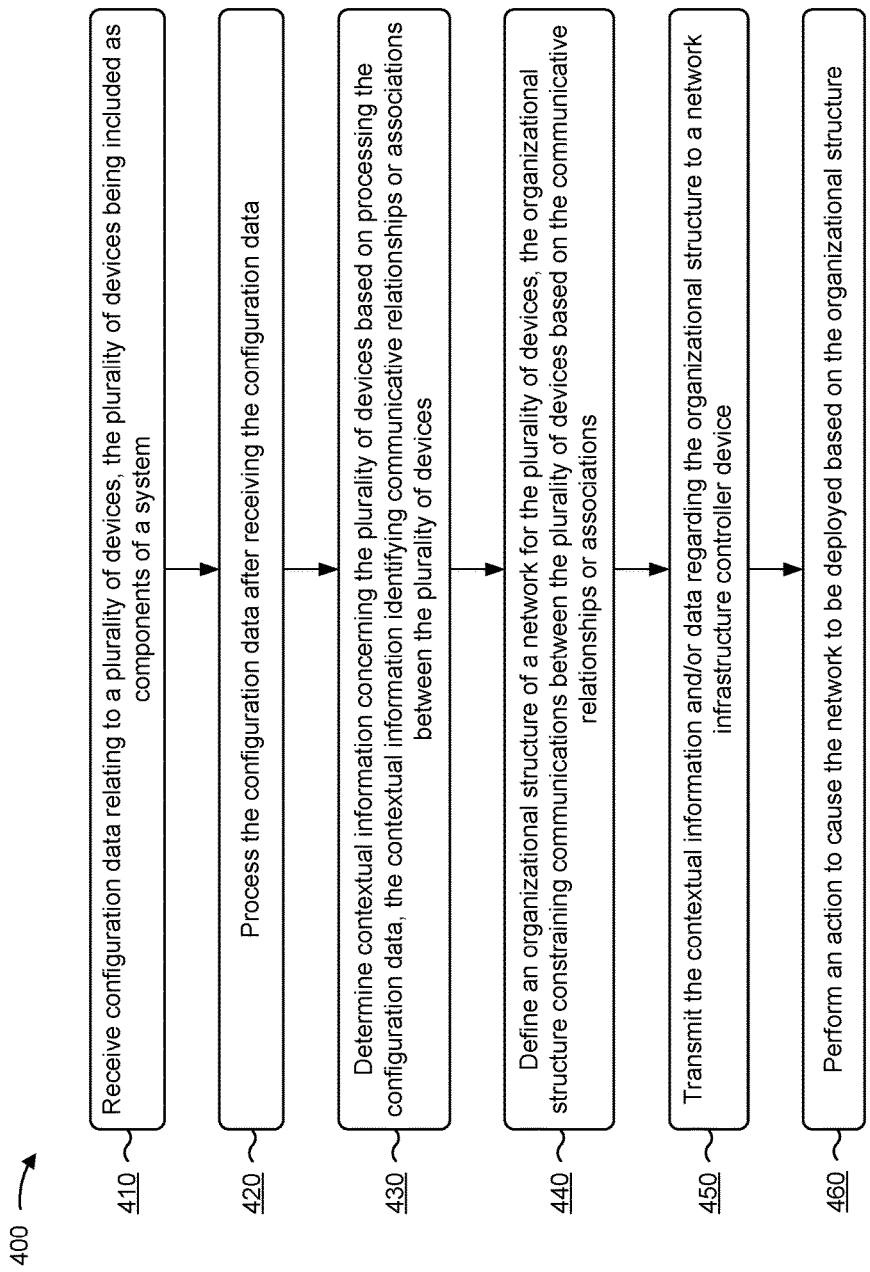
FIG. 4 is a flow chart of an example process for structuring, and deploying, a network for a system.

FIG. 4 is a flow chart of an example process 400 for structuring, and deploying, a network for a system. In some implementations, one or more process blocks of FIG. 4 may be performed by an infrastructure deployment platform (e.g., infrastructure deployment platform 215). In some implementations, one or more process blocks of FIG. 4 may be performed by another device or a group of devices separate from or including the infrastructure deployment platform, such as system device(s) 210 and/or network device(s) 230.

As shown in FIG. 4, process 400 may include receiving configuration data relating to a plurality of devices (e.g., system devices 210), the plurality of devices being included as components of a system (block 410). For example, the infrastructure deployment platform (e.g., using computing resource 222, processor 320, memory 330, storage component 340, input component 350, communication interface 370, and/or the like) may receive configuration data relating to a plurality of devices, as described above in connection with FIGS. 1A-1C. In some implementations, the plurality of devices may be included as components of a system.

As further shown in FIG. 4, process 400 may include processing the configuration data after receiving the configuration data (block 420). For example, the infrastructure deployment platform (e.g., using computing resource 222, processor 320, memory 330, storage component 340, and/or the like) may process the configuration data after receiving the configuration data, as described above in connection with FIGS. 1A-1C.

As further shown in FIG. 4, process 400 may include determining contextual information concerning the plurality of devices based on processing the configuration data, the contextual information identifying communicative relationships or associations between the plurality of devices (block 430). For example, the infrastructure deployment platform (e.g., using computing resource 222, processor 320, memory 330, storage component 340, and/or the like) may determine contextual information concerning the plurality of devices based on processing the configuration data, as described above in connection with FIGS. 1A-1C. In some implementations, the contextual information may identify communicative relationships or associations between the plurality of devices.

As further shown in FIG. 4, process 400 may include defining an organizational structure of a network (e.g., network 235) for the plurality of devices, the organizational structure constraining communications between the plurality of devices based on the communicative relationships or associations (block 440). For example, the infrastructure deployment platform (e.g., using computing resource 222, processor 320, memory 330, storage component 340, and/or the like) may define an organizational structure of a network for the plurality of devices, as described above in connection with FIGS. 1A-1C. In some implementations, the organizational structure may constrain communications between the plurality of devices based on the communicative relationships or associations.

As further shown in FIG. 4, process 400 may include transmitting the contextual information and/or data regarding the organizational structure to a network infrastructure controller device. For example, the infrastructure deployment platform (e.g., using computing resource 222, processor 320, memory 330, storage component 340, communication interface 370, and/or the like) may transmit the contextual information and/or data regarding the organizational structure to a network infrastructure controller device, as described above in connection with FIGS. 1A-1C.

As further shown in FIG. 4, process 400 may include performing an action to cause the network to be deployed based on the organizational structure (block 450). For example, the infrastructure deployment platform (e.g., using computing resource 222, processor 320, memory 330, storage component 340, communication interface 370, and/or the like) may perform an action to cause the network to be deployed based on the organizational structure, as described above in connection with FIGS. 1A-1C.

Process 400 may include additional implementations, such as any single implementation or any combination of implementations described below and/or in connection with one or more other processes described elsewhere herein.

In some implementations, the contextual information may further identify functions associated with two or more devices of the plurality of devices. In some implementations, when defining the organizational structure, the infrastructure deployment platform may define the organizational structure such that the organizational structure constrains the communications between the plurality of devices further based on the functions. In some implementations, when defining the organizational structure, the infrastructure deployment platform may define the organizational structure using virtual local area networks (VLANs), physical segmentation, firewalls, logical segmentation, whitelisting, or blacklisting.

In some implementations, the configuration data may include control logic associated with one or more devices of the plurality of devices, device identification information for two or more devices of the plurality of devices, or address information associated with the two or more devices of the plurality of devices. In some implementations, when receiving the configuration data, the infrastructure deployment platform may receive the configuration data based on detection of a change to initial configuration data and/or instruction code associated with the system.

In some implementations, when performing the action, the infrastructure deployment platform may perform the action to cause the network to be deployed such that security tags are appended to Layer 2 Ethernet frames of transmissions relating to the plurality of devices. In some implementations, the system may include at least one of an industrial control system (ICS), a distributed control system (DCS), a building automation system (BAS), a building management system (BMS), an industrial Internet-of-Things (IIoT) system, an Internet-of-Things (IoT) system, system including one or more medical devices, a system including one or more vehicles, and/or the like.

In some implementations, the infrastructure deployment platform receives the configuration data from a server device located remotely from the plurality of devices.

In some implementations, the network infrastructure controller device is located remotely from the plurality of devices.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
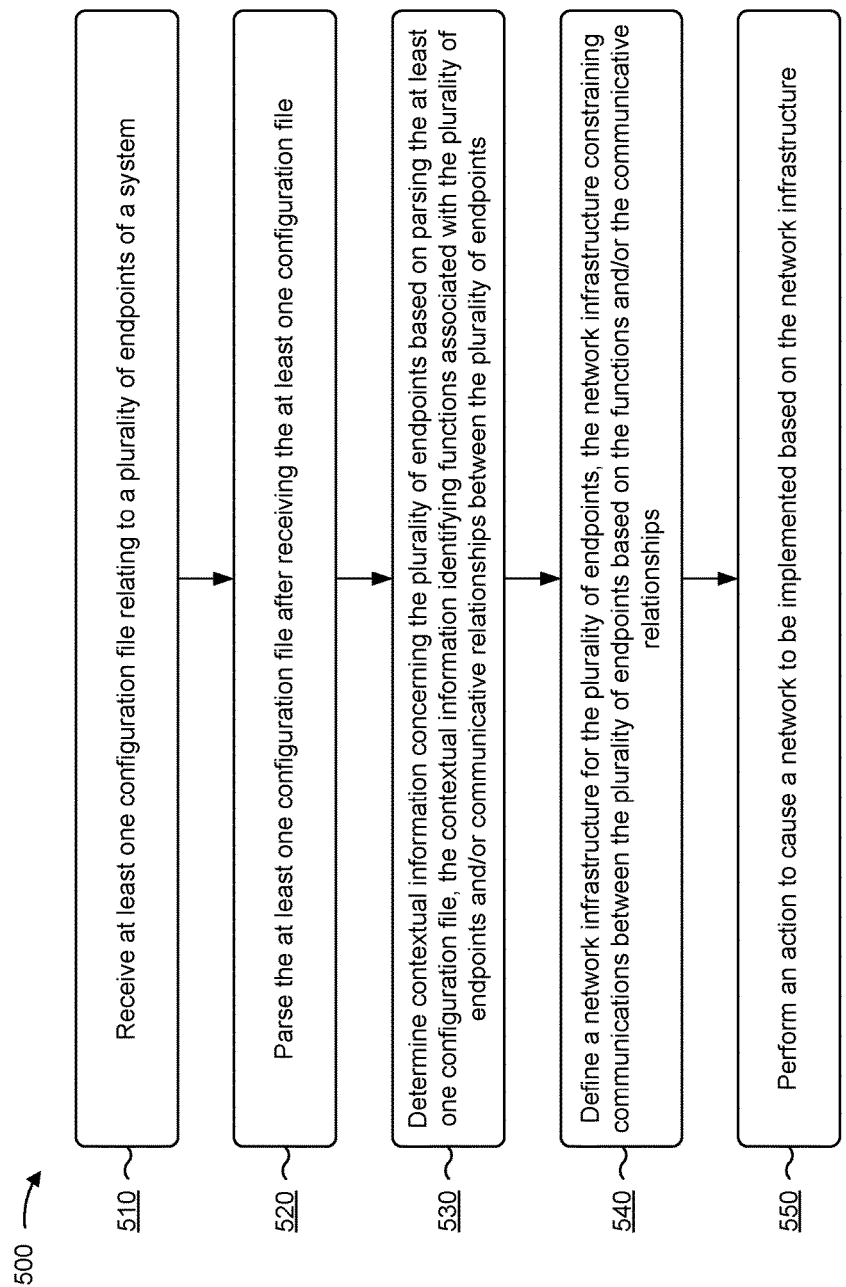
FIG. 5 is a flow chart of an example process for structuring, and deploying, a network for a system.

FIG. 5 is a flow chart of an example process 500 for structuring, and deploying, a network for a system. In some implementations, one or more process blocks of FIG. 5 may be performed by an infrastructure deployment platform (e.g., infrastructure deployment platform 215). In some implementations, one or more process blocks of FIG. 5 may be performed by another device or a group of devices separate from or including the infrastructure deployment platform, such as system device(s) 210 and/or network device(s) 230. In some implementations, a device (e.g., the infrastructure deployment platform) may include one or more memories and one or more processors, communicatively coupled to the one or more memories, configured to perform process 500.

As shown in FIG. 5, process 500 may include receiving at least one configuration file relating to a plurality of endpoints (e.g., system devices 210) of a system (block 510). For example, the infrastructure deployment platform (e.g., using computing resource 222, processor 320, memory 330, storage component 340, input component 350, communication interface 370, and/or the like) may receive at least one configuration file relating to a plurality of endpoints of a system, as described above in connection with FIGS. 1A-1C.

As further shown in FIG. 5, process 500 may include parsing the at least one configuration file after receiving the at least one configuration file (block 520). For example, the infrastructure deployment platform (e.g., using computing resource 222, processor 320, memory 330, storage component 340, and/or the like) may parse the at least one configuration file after receiving the at least one configuration file, as described above in connection with FIGS. 1A-1C.

As further shown in FIG. 5, process 500 may include determining contextual information concerning the plurality of endpoints based on parsing the at least one configuration file, the contextual information identifying functions associated with the plurality of endpoints and/or communicative relationships between the plurality of endpoints (block 530). For example, the infrastructure deployment platform (e.g., using computing resource 222, processor 320, memory 330, storage component 340, and/or the like) may determine contextual information concerning the plurality of endpoints based on parsing the at least one configuration file, as described above in connection with FIGS. 1A-1C. In some implementations, the contextual information may identify functions associated with the plurality of endpoints and/or communicative relationships between the plurality of endpoints.

As further shown in FIG. 5, process 500 may include defining a network infrastructure for the plurality of endpoints, the network infrastructure constraining communications between the plurality of endpoints based on the functions and/or the communicative relationships (block 540). For example, the infrastructure deployment platform (e.g., using computing resource 222, processor 320, memory 330, storage component 340, and/or the like) may define a network infrastructure for the plurality of endpoints, as described above in connection with FIGS. 1A-1C. In some implementations, the network infrastructure may constrain communications between the plurality of endpoints based on the functions and/or the communicative relationships.

As further shown in FIG. 5, process 500 may include performing an action to cause a network to be implemented based on the network infrastructure (block 550). For example, the infrastructure deployment platform (e.g., using computing resource 222, processor 320, memory 330, storage component 340, communication interface 370, and/or the like) may perform an action to cause a network to be implemented based on the network infrastructure, as described above in connection with FIGS. 1A-1C.

Process 500 may include additional implementations, such as any single implementation or any combination of implementations described below and/or in connection with one or more other processes described elsewhere herein.

In some implementations, when defining the network infrastructure, the infrastructure deployment platform may define the network infrastructure by associating virtual local area network (VLAN) identifiers with two or more endpoints of the plurality of endpoints. In some implementations, when defining the network infrastructure, the infrastructure deployment platform may define the network infrastructure based on a virtual local area network (VLAN) schema, physical segmentation, a firewall scheme, logical segmentation, whitelisting, or blacklisting.

In some implementations, the plurality of endpoints may include a control device, an input/output (I/O) device, a human machine interface (HMI) device, or a computing device. In some implementations, the plurality of endpoints may include Internet-of-Things (IoT) devices.

In some implementations, the system may be configured to implement a plurality of processes, and the contextual information may identify, for each endpoint of the plurality of endpoints, an association of the endpoint with one or more processes of the plurality of processes. In some implementations, the system may include a dynamic vehicle communications system.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
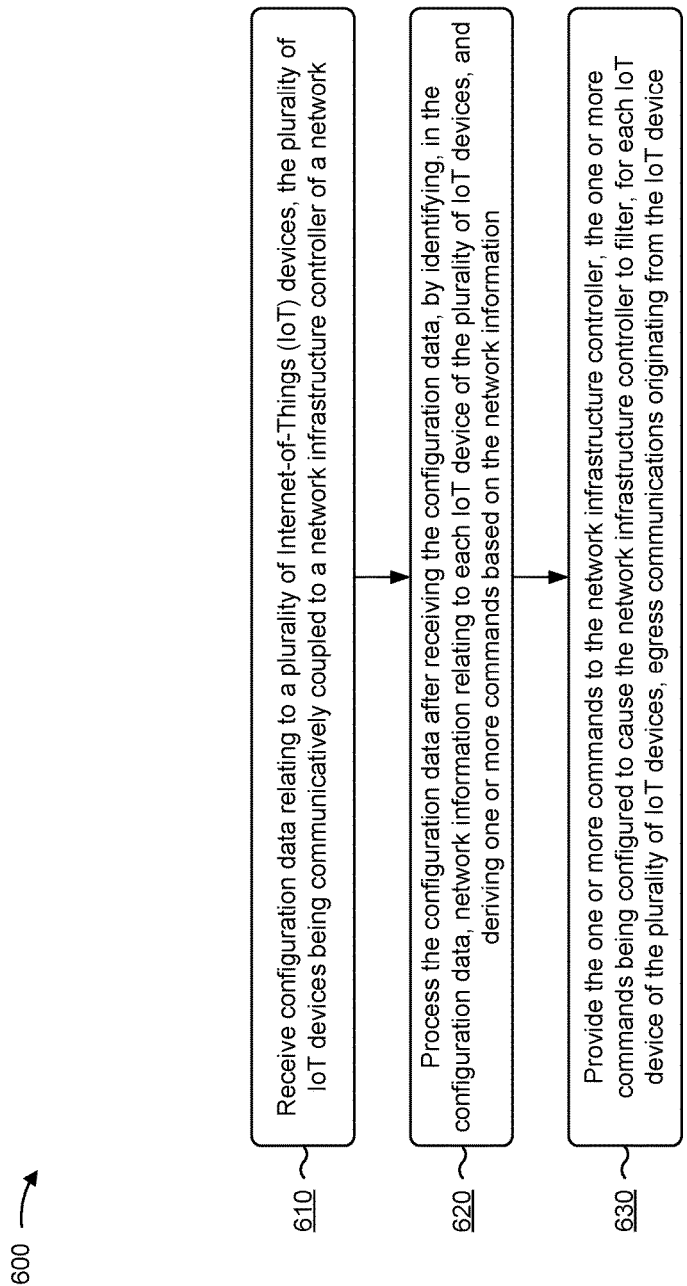
FIG. 6 is a flow chart of an example process for controlling communications between devices.

FIG. 6 is a flow chart of an example process 600 for controlling communications between devices. In some implementations, one or more process blocks of FIG. 6 may be performed by an infrastructure deployment platform (e.g., infrastructure deployment platform 215). In some implementations, one or more process blocks of FIG. 6 may be performed by another device or a group of devices separate from or including the infrastructure deployment platform, such as system device(s) 210 and/or network device(s) 230. In some implementations, a non-transitory computer-readable medium may include instructions. In some implementations, the instructions may include one or more instructions that, when executed by one or more processors of a device (e.g., the infrastructure deployment platform), cause the one or more processors to perform process 600.

As shown in FIG. 6, process 600 may include receiving configuration data relating to a plurality of Internet-of-Things (IoT) devices (e.g., system devices 210), the plurality of IoT devices being communicatively coupled to a network infrastructure controller of a network (e.g., network 235) (block 610). For example, the infrastructure deployment platform (e.g., using computing resource 222, processor 320, memory 330, storage component 340, input component 350, communication interface 370, and/or the like) may receive configuration data relating to a plurality of Internet-of-Things (IoT) devices, as described above in connection with FIGS. 1A-1C. In some implementations, the plurality of IoT devices may be communicatively coupled to a network infrastructure controller of a network.

As further shown in FIG. 6, process 600 may include processing the configuration data, after receiving the configuration data, by identifying, in the configuration data, network information relating to each IoT device of the plurality of IoT devices, and deriving one or more commands based on the network information (block 620). For example, the infrastructure deployment platform (e.g., using computing resource 222, processor 320, memory 330, storage component 340, and/or the like) may process the configuration data after receiving the configuration data, as described above in connection with FIGS. 1A-1C. In some implementations, the infrastructure deployment platform may process the configuration data by identifying, in the configuration data, network information relating to each IoT device of the plurality of IoT devices, and deriving one or more commands based on the network information.

As further shown in FIG. 6, process 600 may include providing the one or more commands to the network infrastructure controller, the one or more commands being configured to cause the network infrastructure controller to filter, for each IoT device of the plurality of IoT devices, egress communications originating from the IoT device (block 630). For example, the infrastructure deployment platform (e.g., using computing resource 222, processor 320, memory 330, storage component 340, output component 360, communication interface 370, and/or the like) may provide the one or more commands to the network infrastructure controller, as described above in connection with FIGS. 1A-1C. In some implementations, the one or more commands may be configured to cause the network infrastructure controller to filter, for each IoT device of the plurality of IoT devices, egress communications originating from the IoT device.

Process 600 may include additional implementations, such as any single implementation or any combination of implementations described below and/or in connection with one or more other processes described elsewhere herein.

In some implementations, the network information may identify, for each IoT device of the plurality of IoT devices, a respective intended communication recipient associated with the IoT device. In some implementations, the one or more commands may be configured to cause the network infrastructure controller to filter egress communications originating from each IoT device, of the plurality of IoT devices, by causing the network infrastructure controller to permit only particular egress communications, that are directed to the respective intended communication recipient associated with the IoT device, to traverse the network.

In some implementations, the network information may identify, for each IoT device of the plurality of IoT devices, an Internet Protocol (IP) address associated with the respective intended communication recipient associated with the IoT device, or a domain name associated with the respective intended communication recipient. In some implementations, the plurality of IoT devices may include consumer IoT devices, industrial IoT devices, or smart city IoT devices. In some implementations, when receiving the configuration data, the infrastructure deployment platform may receive the configuration data from a server device configured to manage the plurality of IoT devices.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

In this way, the infrastructure deployment platform may leverage the structured nature of a system (such as an industrial control system, and/or the like, which has a finite set of controlled outcomes) to design a secure network infrastructure for the devices in the system. Organizing a network infrastructure such that device-to-device communications are constrained based on contextual information, as described herein, solidifies (e.g., hardens) the overall communication architecture of the devices, which provides a more secure network that is less susceptible to attack. This also simplifies the overall network, which enables more efficient deployment of updates and/or upgrades to the system and/or the network. Enabling the design, and deployment, of a network in real-time (or near real-time) while system configurations are being made, as described herein, also allows various portions of the network to be tested throughout the development process, which further improves reliability of the final network. Further, filtering egress communications or traffic in a network (e.g., for a system of IoT devices and/or the like), as described herein, restricts malicious actors from compromising the network, which improves overall system security.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

As used herein, a packet may refer to a communication structure for communicating information, such as a protocol data unit (PDU), a network packet, a frame, a datagram, a segment, a message, a block, a cell, a frame, a subframe, a slot, a symbol, a portion of any of the above, and/or another type of formatted or unformatted unit of data capable of being transmitted via a network.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method, comprising:
   receiving, by an infrastructure deployment platform, configuration data relating to a plurality of devices,
     the plurality of devices being included as components of a system;
   processing, by the infrastructure deployment platform, the configuration data after receiving the configuration data;
   determining, by the infrastructure deployment platform, contextual information concerning the plurality of devices based on processing the configuration data,
     the contextual information identifying communicative relationships or associations between the plurality of devices;
   defining, by the infrastructure deployment platform, an organizational structure of a network for the plurality of devices,
     the organizational structure constraining communications between the plurality of devices based on the communicative relationships or associations;
   transmitting, by the infrastructure deployment platform, the contextual information or data regarding the organizational structure to a network infrastructure controller device; and
   performing, by the infrastructure deployment platform, an action to cause the network to be deployed based on the organizational structure.

2. The method of claim 1, wherein the contextual information further identifies:
   functions associated with two or more devices of the plurality of devices; and
   wherein defining the organizational structure includes:
     defining the organizational structure such that the organizational structure constrains the communications between the plurality of devices further based on the functions.

3. The method of claim 1, wherein defining the organizational structure includes:
   defining the organizational structure using at least one of:
     virtual local area networks (VLANs),
     physical segmentation,
     firewalls,
     logical segmentation,
     whitelisting, or
     blacklisting.

4. The method of claim 1, wherein the configuration data includes:
   control logic associated with one or more devices of the plurality of devices;
   device identification information for two or more devices of the plurality of devices; or
   address information associated with the two or more devices of the plurality of devices.

5. The method of claim 1, wherein receiving the configuration data includes:
   receiving the configuration data based on detection of a change to initial configuration data and/or instruction code associated with the system.

6. The method of claim 1, wherein performing the action includes:
   performing the action to cause the network to be deployed such that security tags are appended to Layer 2 Ethernet frames of transmissions relating to the plurality of devices.

7. The method of claim 1, wherein the system includes at least one of:
   an industrial control system (ICS),
   a distributed control system (DCS),
   a building automation system (BAS),
   a building management system (BMS),
   an industrial Internet-of-Things (IIoT) system,
   an Internet-of-Things (IoT) system,
   a system including one or more medical devices, or
   a system including one or more vehicles.

8. The method of claim 1, wherein the infrastructure deployment platform receives the configuration data from a server device located remotely from the plurality of devices.

9. The method of claim 1, wherein the network infrastructure controller device is located remotely from the plurality of devices.

10. A device, comprising:
one or more memories; and
one or more processors, communicatively coupled to the one or more memories, configured to:
receive at least one configuration file relating to a plurality of endpoints of a system;
parse the at least one configuration file after receiving the at least one configuration file;
determine contextual information concerning the plurality of endpoints based on parsing the at least one configuration file,
the contextual information identifying functions associated with the plurality of endpoints and/or communicative relationships between the plurality of endpoints;
define a network infrastructure for the plurality of endpoints,
the network infrastructure constraining communications between the plurality of endpoints based on the functions and/or the communicative relationships; and
perform an action to cause a network to be implemented based on the network infrastructure.

11. The device of claim 10, wherein the one or more processors, when defining the network infrastructure, are configured to:
define the network infrastructure by associating identifiers with two or more endpoints of the plurality of endpoints.

12. The device of claim 10, wherein the one or more processors, when defining the network infrastructure, are configured to:
define the network infrastructure based on at least one of:
a virtual local area network (VLAN) schema,
physical segmentation,
a firewall scheme,
logical segmentation,
whitelisting, or
blacklisting.

13. The device of claim 10, wherein the plurality of endpoints includes:
a control device;
an input/output (I/O) device;
a human machine interface (HMI) device; or
a computing device.

14. The device of claim 10, wherein the plurality of endpoints includes Internet-of-Things (IoT) devices.

15. The device of claim 10, wherein the system is configured to implement a plurality of processes; and
wherein the contextual information identifies, for each endpoint of the plurality of endpoints, an association of the endpoint with one or more processes of the plurality of processes.

16. The device of claim 10, wherein the system includes a dynamic vehicle communications system or a vehicle control system.

17. A non-transitory computer-readable medium comprising instructions, the instructions comprising:
one or more instructions that, when executed by one or more processors of a device, cause the one or more processors to:
receive configuration data relating to a plurality of Internet-of-Things (IoT) devices,
the plurality of IoT devices being communicatively coupled to a network infrastructure controller of a network;
process the configuration data after receiving the configuration data,
wherein the one or more instructions, that cause the one or more processors to process the configuration data, cause the one or more processors to:
identify, in the configuration data, network information relating to each IoT device of the plurality of IoT devices, and
derive one or more commands based on the network information; and
provide the one or more commands to the network infrastructure controller,
the one or more commands being configured to cause the network infrastructure controller to filter, for each IoT device of the plurality of IoT devices, egress communications originating from the IoT device.

18. The non-transitory computer-readable medium of claim 17, wherein the network information identifies, for each IoT device of the plurality of IoT devices, a respective intended communication recipient associated with the IoT device.

19. The non-transitory computer-readable medium of claim 18, wherein the one or more commands are configured to cause the network infrastructure controller to filter egress communications originating from each IoT device, of the plurality of IoT devices, by:
causing the network infrastructure controller to permit only particular egress communications, that are directed to the respective intended communication recipient associated with the IoT device, to traverse the network.

20. The non-transitory computer-readable medium of claim 18, wherein the network information identifies, for each IoT device of the plurality of IoT devices:
an Internet Protocol (IP) address associated with the respective intended communication recipient associated with the IoT device; or
a domain name associated with the respective intended communication recipient.

* * * * *